Oct. 13, 1925.  1,556,773
F. J. FEELY
COMBINATION MOUNTING FOR DIAL MECHANISMS
Filed Nov. 10, 1919   3 Sheets-Sheet
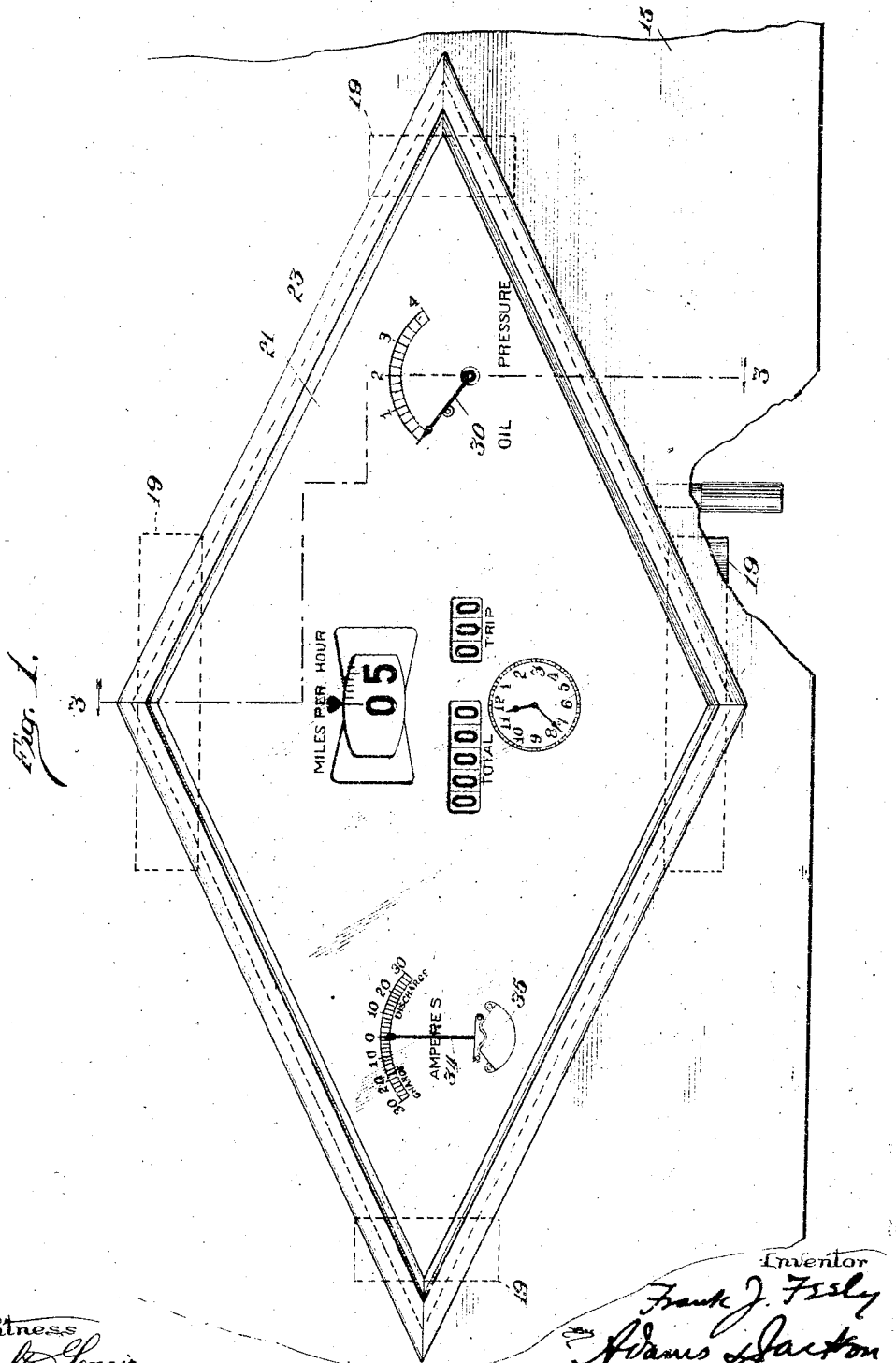

Oct. 13, 1925.
F. J. FEELY
1,556,773
COMBINATION MOUNTING FOR DIAL MECHANISMS
Filed Nov. 10, 1919  3 Sheets-Sheet 2
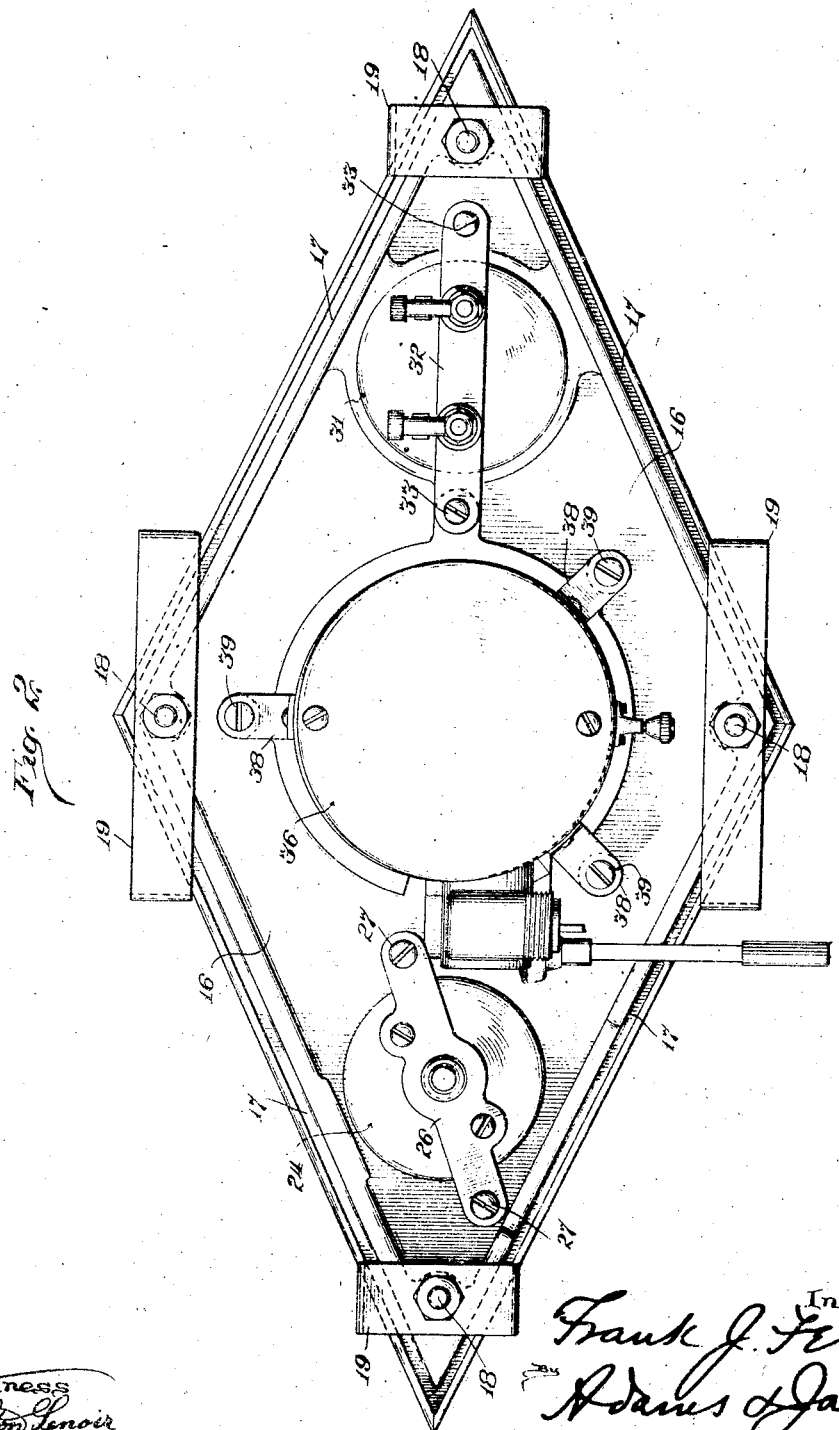

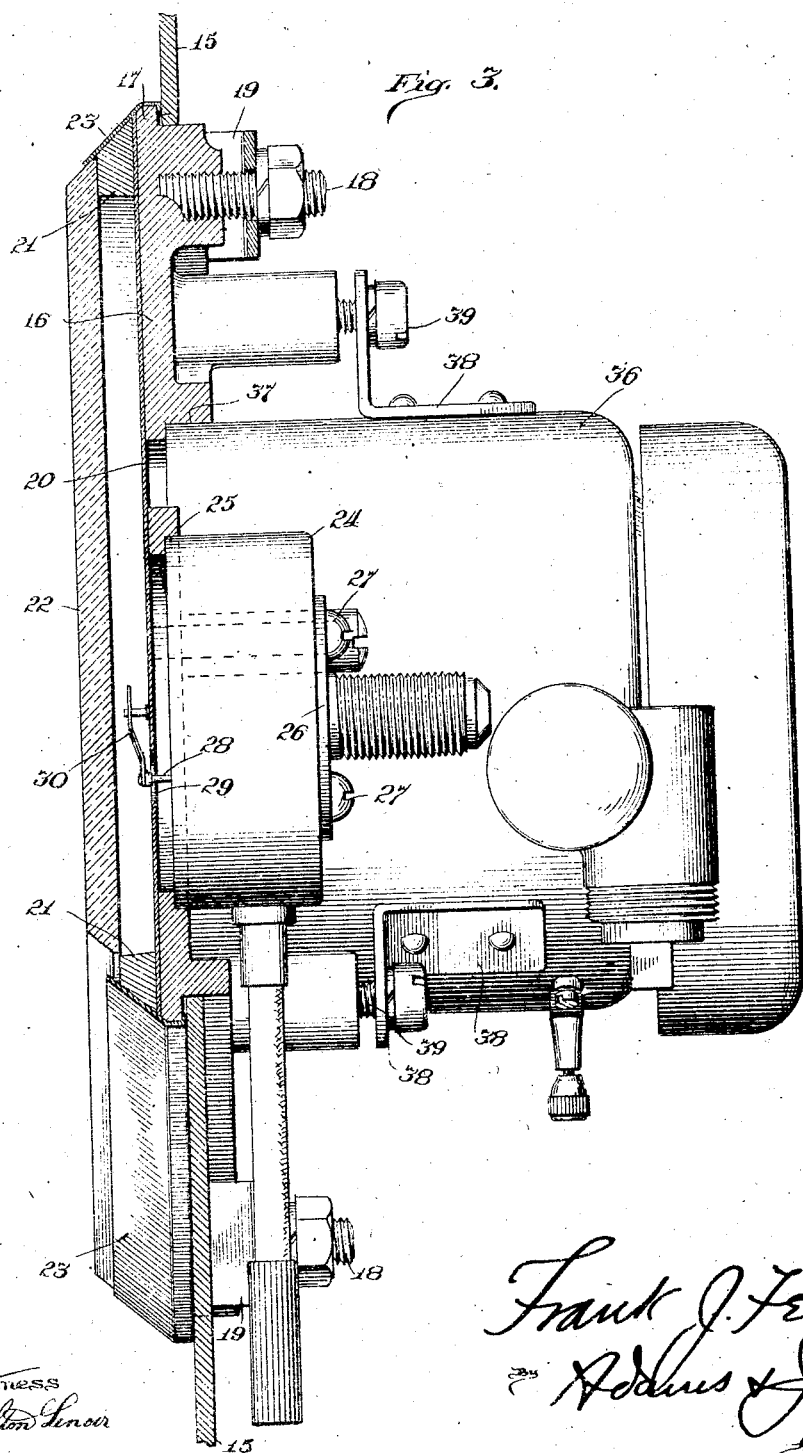

Patented Oct. 13, 1925.

1,556,773

UNITED STATES PATENT OFFICE.

FRANK J. FEELY, OF ELGIN, ILLINOIS, ASSIGNOR, BY MESNE ASSIGNMENTS, TO STEW-ART-WARNER SPEEDOMETER CORPORATION, OF CHICAGO, ILLINOIS, A CORPORATION OF VIRGINIA.

COMBINATION MOUNTING FOR DIAL MECHANISMS.

Application filed November 10, 1919. Serial No. 337,060.

*To all whom it may concern:*

Be it known that I, FRANK J. FEELY, a citizen of the United States, and a resident of Elgin, in the county of Kane and State of Illinois, have invented certain new and useful Improvements in Combination Mountings for Dial Mechanisms, of which the following is a specification, reference being had to the accompanying drawings.

My invention relates to combination mountings for dial mechanisms, and it has for its principal object to provide suitable means for mounting upon the dash-board of an automobile the several instruments which it is customary to provide. It is one of the objects of my invention to provide a unit structure for the several mechanisms such that the mechanisms themselves are held properly in position and are adapted to be removed readily from position and such that the entire mounting with the instruments in position thereon may be readily removed from the dash-board as may be desired. It is another object to improve mechanisms of this type in sundry details hereinafter pointed out. The preferred means by which I have accomplished my several objects are illustrated in the drawings and are hereinafter specifically described. That which I believe to be new and desire to cover by Letters Patent is set forth in the claims.

In the drawings:—

Fig. 1 is a front view showing my improved mounting in position upon the dashboard of an automobile.

Fig. 2 is a rear view of the parts shown in Fig. 1, and

Fig. 3 is a vertical cross-section taken on line 3—3 of Fig. 1.

Referring to the several figures of the drawings,—in which corresponding parts are indicated by the same reference characters, 15 indicates the dash-board of an automobile having a frame 16 in the form of a plate mounted in a suitable opening in the board, in the construction shown the frame plate being diamond-shaped. At the outer edge of the frame 16 there is a relatively thin flange 17 which overlaps the front face of the board 15, as is clearly shown in Fig. 3, so that the edge of the frame, 16, which is inside the flange, 17, forms a rearwardly extending shoulder which positions the frame in the opening of the board, 15. At each of its corners the frame 16 is provided with a rearwardly projecting screw-threaded pin 18, in the construction shown these pins being secured in position in the operation of casting the frame 16. Spring clips 19 are mounted upon the pins 18, having their turned end portions in contact with the rear face of the board 15, being held in position on the pins by means of suitable nuts for clamping the frame 16 securely in position in the opening of the board.

Mounted on the front face of the frame 16 there is dial 20. A sealing band 21 mounted on the front face of the dial serves to space a crystal or plate-glass 22 away from the dial. As is best shown in Fig. 3, the dial, the sealing band and the crystal are held in position upon the front face of the frame 16 by means of a tapered sheet metal band or bezel 23 which engages the beveled outer edges of the crystal and the sealing band and has its rear edge rolled down slightly about the rear face of the flange 17 of the frame 16.

A pressure gauge 24 is mounted on the rear face of the plate 16 in a shallow socket 25 as is clearly shown in Fig. 3, being held in position by means of a bar 26 extending across the rear face of the gauge and having its end portions secured by screws 27 to the plate 16. The arbor 28 of the gauge 24 extends through a suitable opening 29 of the dial 20, with an indicating hand 30 mounted upon the forward end of the arbor. As is clearly shown in Fig. 3, the indicating hand 30 is offset forward adjacent to the arbor upon which it is mounted to permit the arbor to pass backwardly through the opening 29 and the gauge to be drawn backwardly out of engagement with the socket 25. Thereupon the gauge may be shifted sidewise and removed without removing the hand from the gauge. As is shown in Fig. 1 the dial 20 is provided with suitable markings for the hand 30.

An ammeter 31 of any suitable type is also mounted upon the plate 16, such ammeter being held in position by means of a cross-bar 32 secured in position by screws 33. The indicating hand 34 of the ammeter is pivotally mounted upon the front face of the dial 20 by means of a bracket 35 in proper position with respect to suitable markings upon the dial.

A speedometer 36 of any suitable type is mounted upon the rear face of the plate 16 in a suitable socket 37 formed in such plate. Brackets 38 mounted upon the casing of the speedometer serve to hold the instrument in position by means of screws 39 secured by screw-threads in the rear face of the plate. As is clearly shown in Fig. 1, the dial 20 is provided with suitable sight-openings and suitable markings for the indicating parts of the speedometer.

By my improvements, I have provided a very compact and convenient mounting which can be used to very good advantage in new construction and to equal advantage for installation in completed cars. It will be understood that I do not wish to limit myself to the use upon the mounting of the particular indicating instruments illustrated, except as may be specifically claimed.

What I claim as my invention and desire to secure by Letters Patent, is—

1. A mechanism for mounting a combination of instruments upon a dash-board, comprising a frame adapted to fit substantially a suitable opening in the board and having a flange extending beyond the edge of the opening on its front face, a plurality of instruments mounted on said frame, and a plurality of spring clips secured at intermediate points on said frame and bearing at their ends on the rear face of the board.

2. A mechanism for mounting a combination of instruments upon a dash-board, comprising a frame adapted to fit substantially a suitable opening in the board and having a flange extending beyond the edge of the opening on its front face, a plurality of instruments mounted on said frame, and a plurality of spring clips in the form of yokes secured at intermediate points on said frame and bearing yieldingly at their ends on the rear face of the board.

3. A mechanism for mounting a combination of instruments upon a dash-board, comprising a cast metal frame adapted to fit substantially a suitable opening in the board and having a flange extending beyond the edge of the opening on its front face, a plurality of instruments mounted on said frame, a plurality of screw-threaded pins cast in said frame and extending rearwardly therefrom, and a plurality of spring clips secured at intermediate points on said pins and bearing yieldingly at their ends on the rear face of the board.

4. A mechanism for mounting a combination of instruments upon a dash-board, comprising a frame, a dial in position on the front face of said frame, a plurality of indicating instruments mounted on said frame in proper relationship to suitable markings on the dial, a plate-glass in front of said dial, means for spacing said glass from said dial, and a sheet metal band holding the said glass in position on said frame having one edge rolled down embracing the assembly.

5. A mechanism for mounting a combination of instruments upon a dash-board, comprising a frame, a dial in position on the front face of said frame, a plurality of indicating instruments mounted on said frame in proper relationship to suitable markings on the dial, a plate-glass in front of said dial, a sealing band spacing the edges of said glass from the dial, and a sheet metal band embracing said glass and having its edge rolled down embracing the frame for holding the glass in position upon the frame.

6. A mechanism for mounting a combination of instruments upon a dash-board, comprising a frame, a dial in position on the front face of said frame, a plurality of indicating instruments mounted on said frame in proper relationship to suitable markings on the dial, a sealing band in position on the front face of said frame and having a beveled outer edge, a plate-glass in front of said sealing band and spaced thereby away from the dial, said glass also having a beveled outer edge in alignment with the beveled edge of said sealing band, and a tapered sheet metal band fitting about said glass and said sealing band and having its edge rolled down embracing the frame for holding the glass in position upon the frame.

7. The combination of a supporting frame, a dial in position on the front face of said frame, an indicating instrument fitted in a suitable socket in said frame and held removably therein with an arbor extending through an opening in said dial, and an indicating hand on said arbor in proper relationship to suitable markings on the dial, the opening through which the arbor passes being slightly larger than the arbor whereby the instruments can be removed without detaching the indicating hand.

8. The combination of a supporting frame, a dial in position on the front face of said frame, an indicating instrument fitted in a suitable socket in said frame and held removably therein with an arbor extending through an opening in said dial, and an indicating hand on said arbor in proper relationship to suitable markings on the dial, the socket in said frame being comparatively shallow whereby the indicating instrument can be moved laterally after a slight movement toward the rear, the opening in the dial for the arbor being slightly larger than the arbor whereby the instrument can be removed without detaching the indicating hand.

9. The combination of a supporting frame, a dial in position on the front face of the frame, an indicating instrument fitted in a suitable shallow socket in said frame and removably held therein with its front face spaced a short distance from the dial and with an arbor extending through an opening in the dial of slightly larger size than that of the arbor, and an indicating hand on said arbor in proper relationship to suitable markings on the dial, said hand being offset forwardly to permit the passage of the indicating hand through the opening in the dial as the indicating instrument is moved laterally and rearwardly with respect to the frame.

10. A mechanism for mounting a combination of instruments upon a dashboard, comprising a frame, a dial mounted upon said frame, a cover glass secured in fixed relation to said dial and frame at a short distance in front of the dial, and instruments mounted on said frame, separately detachable therefrom.

11. A mechanism for mounting instruments upon a dashboard, which comprises a frame adapted to fit substantially a suitable opening in the board and having a flange extending beyond the edge of the opening on its front face, a dial mounted on said frame, a cover-glass mounted on said frame and spaced a distance in front of said dial, and an instrument supported on said frame and having an indicating pointer movable between said dial and said cover-glass, said instrument being removable from said frame and dial without detaching said indicating pointer.

12. A mechanism for mounting a combination of instruments upon a dashboard, comprising a frame having a rearwardly extending shoulder adapted to fit substantially a suitable opening in the board and a marginal flange extending beyond the edge of the opening overlapping the front face of the board, a plurality of instruments mounted on said frame and means for holding said flange tightly against the front face of the board.

FRANK J. FEELY.